United States Patent
Kang (10) Patent No.: US 11,999,349 B2
(45) Date of Patent: Jun. 4, 2024

(54) METHOD AND SYSTEM FOR TARGET DETECTION OF VEHICLE

(71) Applicant: HYUNDAI MOBIS Co., Ltd., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 103 days.

(21) Appl. No.: 17/531,102

(22) Filed: Nov. 19, 2021

(65) Prior Publication Data

US 2022/0185287 A1 Jun. 16, 2022

(30) Foreign Application Priority Data

Dec. 16, 2020 (KR) .................. 10-2020-0176770

(51) Int. Cl.
*B60W 30/18* (2012.01)
*B60Q 9/00* (2006.01)
*B60W 30/12* (2020.01)
*B60W 50/00* (2006.01)
*B60W 50/14* (2020.01)

(52) U.S. Cl.
CPC ....... *B60W 30/18145* (2013.01); *B60Q 9/008* (2013.01); *B60W 30/12* (2013.01); *B60W 50/14* (2013.01); *B60W 2050/0022* (2013.01); *B60W 2520/06* (2013.01); *B60W 2520/10* (2013.01); *B60W 2520/12* (2013.01); *B60W 2520/14* (2013.01); *B60W 2540/18* (2013.01)

(58) Field of Classification Search
CPC ........... B60W 30/18145; B60W 30/12; B60W 50/14; B60W 2050/0022; B60W 2520/06; B60W 2520/10; B60W 2520/12; B60W 2520/14; B60W 2540/18; B60Q 9/008
See application file for complete search history.

(56) References Cited

U.S. PATENT DOCUMENTS

| | | | |
|---|---|---|---|
| 2020/0074863 A1 | 3/2020 | Jung et al. | |
| 2020/0180612 A1 | 6/2020 | Finelt et al. | |
| 2020/0312150 A1* | 10/2020 | Wang | G08G 1/167 |
| 2020/0317196 A1* | 10/2020 | Yoshida | B60W 30/181 |
| 2021/0197811 A1* | 7/2021 | Tsushima | B60W 30/0956 |

FOREIGN PATENT DOCUMENTS

| | | |
|---|---|---|
| KR | 10-1521870 B1 | 5/2015 |
| WO | 2016/189112 A1 | 12/2016 |

OTHER PUBLICATIONS

Extended European Search Report issued in corresponding European Patent Application No. 21208254.9 dated May 6, 2022, with English translation.

* cited by examiner

*Primary Examiner* — Jaime Figueroa
*Assistant Examiner* — Jamal A Shah
(74) *Attorney, Agent, or Firm* — MORGAN, LEWIS & BOCKIUS LLP (57) ABSTRACT

A method and system for target detection of a vehicle is proposed. In the method and system, when the vehicle is turning, a warning signal according to a risk level of collision is generated at the right timing as a risk level of collision between the host vehicle and the other vehicle behind the host vehicle may be accurately identified by correcting a driving path of the host vehicle and position of the other vehicle on the basis of a driving state of the host vehicle.

7 Claims, 8 Drawing Sheets

METHOD AND SYSTEM FOR TARGET DETECTION OF VEHICLE

CROSS REFERENCE TO RELATED APPLICATION

The present application claims priority to Korean Patent Application No. 10-2020-0176770, filed Dec. 16, 2020, the entire contents of which are incorporated herein for all purposes by this reference.

BACKGROUND OF THE INVENTION

Field of the Invention

The present invention relates to a method and system for target detection of a vehicle, which accurately detects another vehicle, as a target, behind a host vehicle and transmits a warning signal thereto.

Description of the Related Art

A blind spot warning system of a vehicle warns the driver when there is an obstacle in the blind spot of the vehicle when the vehicle is driving or when it is determined that there is a risk of collision with another vehicle approaching from the rear at high speed while the host vehicle is changing lanes either to left or to right, therefore the system improves the driver's convenience.

Specifically, such a blind spot warning system includes a blind spot detection (BSD) system that notifies the driver when an obstacle is in the blind spot where is the rear side of the vehicle, and a lane change assist (LCA) system that warns the driver in the event of the vehicle changing lanes when a possibility of a collision caused by another vehicle approaching from the rear side at high speed is determined. In particular, recently, a blind spot warning system implemented with both a BSD function and an LCA function has been developed so as to detect a large area and effectively inform the driver of a danger.

The blind spot warning system of a vehicle according to the related art generates a warning through a radar sensor that detects the rear side of the host vehicle when another vehicle causing a risk of collision is detected. However, when the host vehicle is turning, a sensing range of the radar sensor does not include the other vehicle behind the host vehicle as a moving direction of the host vehicle changes. Furthermore, there is a problem of generating a false warning caused by abnormally sensing the other vehicle located behind the host vehicle.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problem occurring in the related art, and the present invention is intended to provide a method and system for target detection of a vehicle, which is configured such that a warning signal is accurately generated according to the risk of collision with another vehicle behind a host vehicle by correcting the position of the other vehicle running behind the host vehicle according to the driving direction of the host vehicle when the host vehicle is turning.

In order to achieve the above objective, according to an embodiment of the present invention, there is provided a method for target detection of a vehicle, including: collecting driving path data of the vehicle; detecting position data of a target; correcting the driving path data of the vehicle and the position data of the target on the basis of a moving distance and a moving angle of the vehicle when the vehicle is turning; and identifying a relative position of the target with respect to the vehicle, on the basis of both the corrected driving path data of the vehicle and the position data of the target.

The collecting the driving path data may include, when the vehicle is turning, deriving past movement coordinates of the vehicle according to the moving distance and the moving angle on the basis of current reference coordinates of the vehicle.

The collecting the driving path data may include deriving the moving angle based on a yaw rate and a steering wheel angle of the turning vehicle.

The collecting the driving path data may include deriving the moving angle with a weight given according to a driving speed of the vehicle.

The correcting the driving path data and the position data may include deriving a plurality of past movement coordinates and position coordinates of the target detected from each past movement coordinate, and correcting the past movement coordinates and the position coordinates so that the past movement coordinates and the position coordinates are arranged in one direction.

The method may further include determining, according to the position of the target, whether or not to generate a warning signal, as the relative position of the target with respect to the vehicle is identified through the identifying the relative position of the target.

The determining may include determining not to generate the warning signal when the relative position of the target with respect to the vehicle is confirmed to be located on a straight line of the vehicle, as the target is detected when the vehicle is turning.

The determining may include determining to generate the warning signal when the relative position of the target with respect to the vehicle is located at a predetermined angle or more from the vehicle, as the target is not detected when the vehicle is turning.

Meanwhile, according to an embodiment of the invention, there is provided a system for target detection of a vehicle, including: a distance calculator configured to determine a moving distance of the vehicle; an angle calculator configured to determine a moving angle of the vehicle; a target sensor configured to detect a position of a target; and a controller configured to collect driving path data of the vehicle, to detect position data of the target, to correct past driving path data of the vehicle and position data of the target on the basis of the moving distance and the moving angle of the vehicle when the vehicle is turning, and to identify a relative position of the target with respect to the vehicle on the basis of the corrected driving path data of the vehicle and the position data of the target.

The controller may derive a plurality of past movement coordinates on the basis of the driving path data, derive position coordinates of the target from each past movement coordinate which are detected by the target sensor, and correct the past movement coordinates and the position coordinates to be arranged in one direction.

The system may further include a warning generator configured to generate a warning signal according to a risk level of collision between the host vehicle and the target vehicle. The controller may determine whether or not the warning signal to be generated through the warning generator according to the position of the target, as the relative position of the target with respect to the vehicle is identified.

The controller may prevent the warning signal from being generated through the warning generator as it is confirmed that the relative position of the target with respect to the vehicle is located on a straight line of the vehicle when the target is detected when the vehicle is turning.

The controller may generate the warning signal through the warning generator when the relative position of the target with respect to the vehicle is confirmed to be located at a predetermined angle or more from the vehicle when the target is detected when the vehicle is turning.

The controller may generate the warning signal through the warning generator as the relative position of the target with respect to the vehicle is located at a predetermined angle or more from the vehicle when the target is not detected when the vehicle is turning.

According to an exemplary embodiment of the present invention, a warning signal in line with the risk level of collision may be generated at the right timing as the collision risk between the host vehicle and another vehicle is accurately identified by correcting the driving path of the host vehicle and the position of the other vehicle on the basis of a driving state of the host vehicle when the host vehicle is turning.

BRIEF DESCRIPTION OF THE DRAWINGS

The above and other objectives, features, and other advantages of the present invention will be more clearly understood from the following detailed description when taken in conjunction with the accompanying drawings, in which:

FIGS. 2A to 6 are views explaining the method shown in FIG. 1.

DETAILED DESCRIPTION OF THE INVENTION

In the following description, the structural or functional description specified to exemplary embodiments according to the concept of the present invention is intended to describe the exemplary embodiments, and it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be construed in the same manner.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, preferred embodiments of the present invention will be described in detail with reference to accompanying drawings. Like reference numerals given in the drawings indicate like components.

Hereinafter, a system and method for detecting a blind spot of a vehicle according to a preferred embodiment of the present invention will be described with reference to the accompanying drawings.

Figure 1:
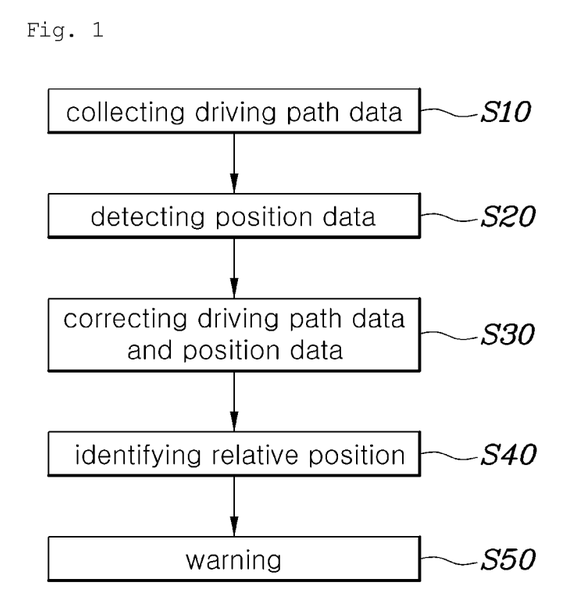
FIG. 1 is a flowchart showing a method according to an embodiment of the present invention.
Figure 5:
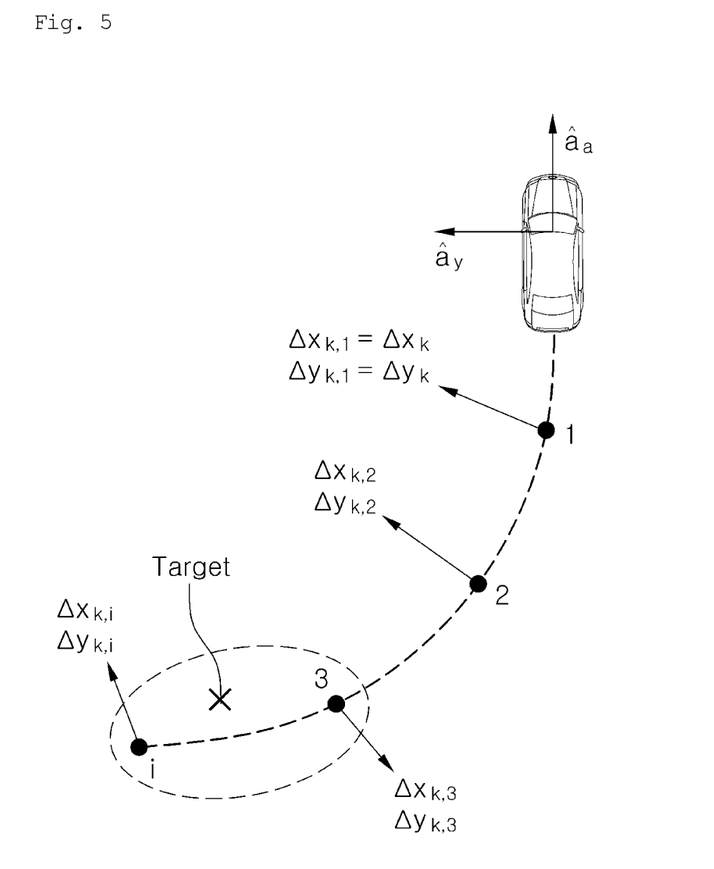
Figure 6:
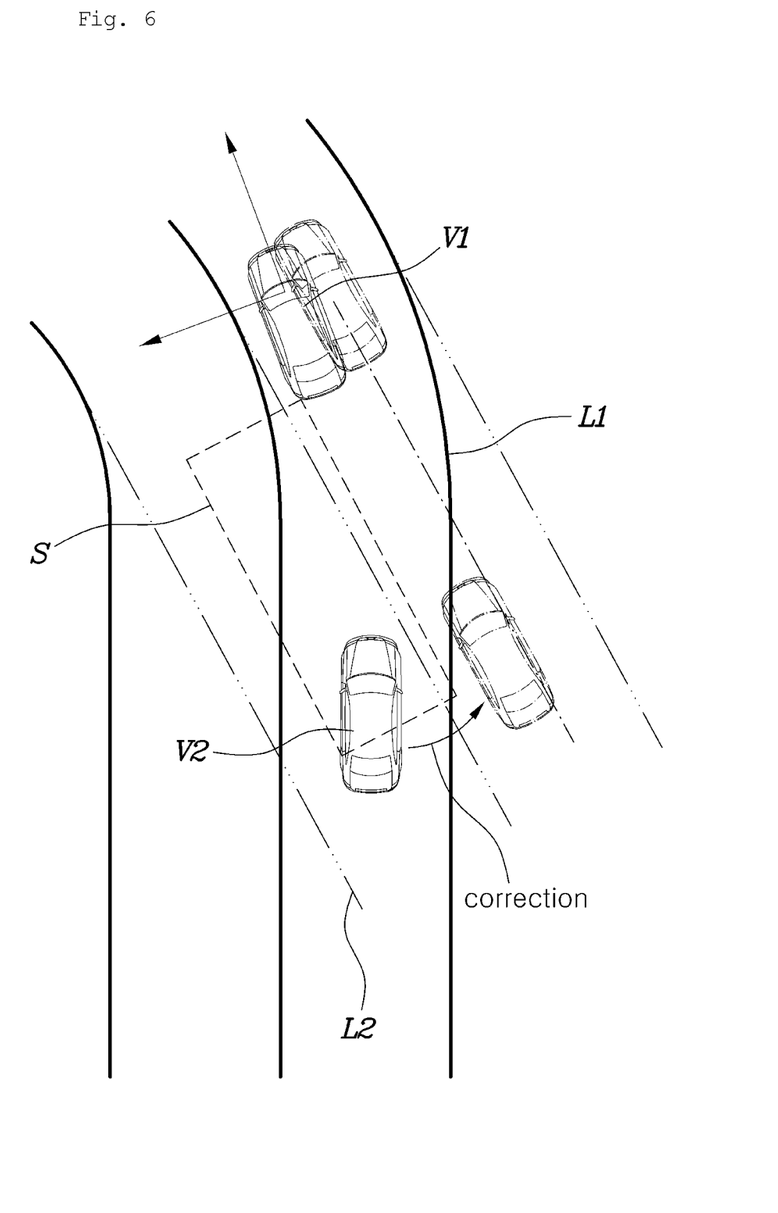
Figure 7:
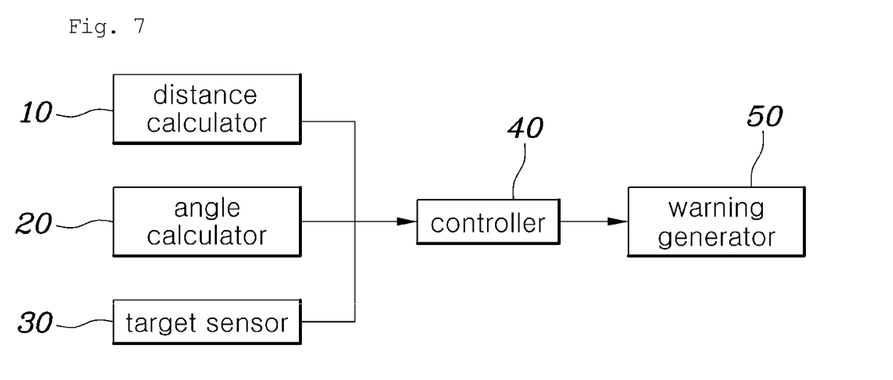
FIG. 7 is a block diagram illustrating the method according to the embodiment of the present invention.

FIG. 1 is a flowchart showing a method according to an embodiment of the present invention, FIGS. 2A to 6 are views explaining the method shown in FIG. 1, and FIG. 7 is a block diagram illustrating the method according to the embodiment of the present invention.

Referring to FIG. 1, the method for target detection of a vehicle according to this embodiment includes: collecting driving path data of the vehicle at S10; detecting position data of a target at S20; correcting the driving path data of the vehicle and the position data of the target on the basis of a moving distance and a moving angle of the vehicle when the vehicle is turning at S30; and identifying a relative position of the target with respect to the vehicle at S40, on the basis of both the corrected driving path data of the vehicle and the position data of the target.

Driving path data of the vehicle may be information of driving speed of the host vehicle, a turning angle, a moving distance, and the like, and each information may be collected through a GPS, a steering wheel sensor, a yaw rate sensor, and a speed sensor.

Position data of the target is information of an obstacle located behind the host vehicle, which is the other vehicle running behind the host vehicle. The position data of the target may determine the position of the other vehicle driving behind through a radar sensor, a camera sensor, a laser sensor, and the like.

As described above, the driving path data of the vehicle may be collected through the collecting at S10, and the position data of the target may be detected through the detecting at S20.

Meanwhile, in the correcting at S30, the driving path data of the vehicle and the position data of the target may be corrected on the basis of the moving distance and the moving angle of the vehicle when the vehicle is turning.

Figure 2A:
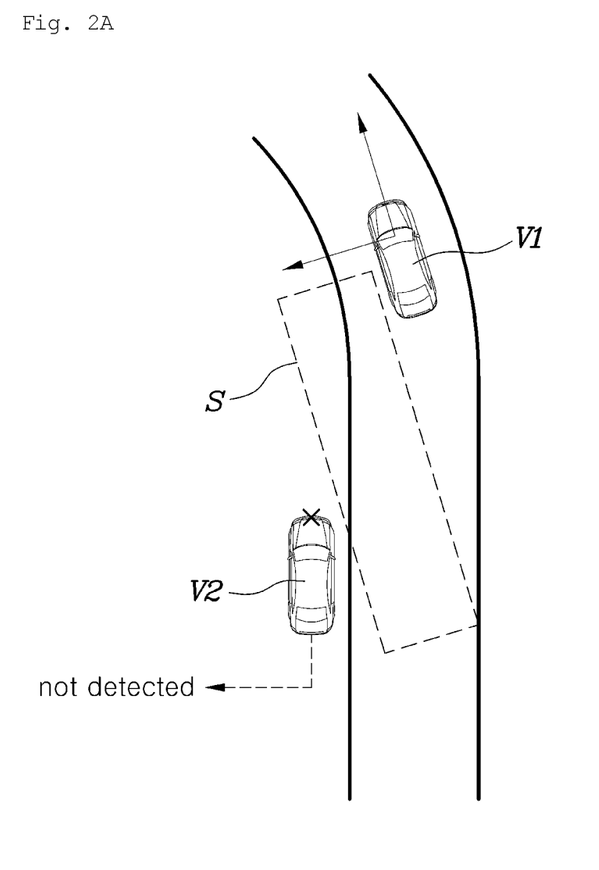
Figure 2B:
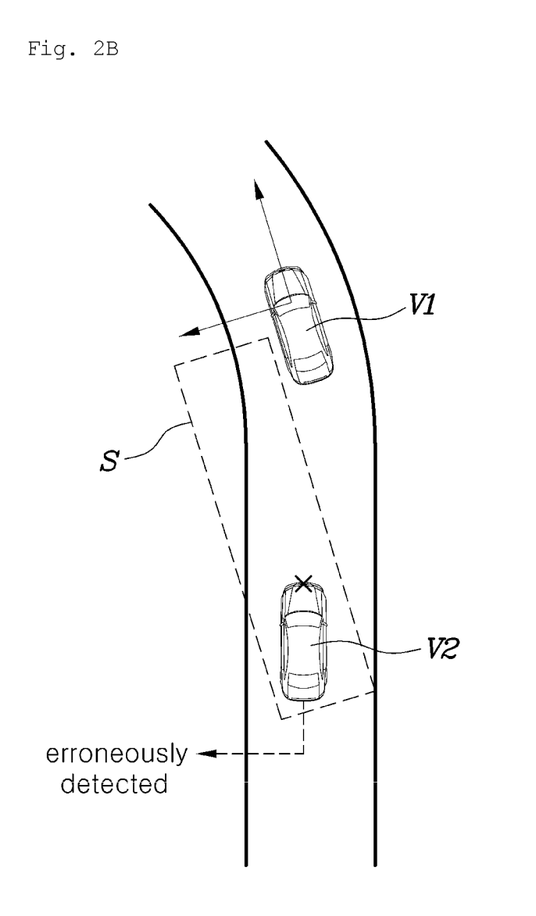

That is, in a state in which the host vehicle is driving in a straight line, the position of the other vehicle driving behind the host vehicle may be accurately detected by a sensing range set behind the host vehicle. However, when the host vehicle turns, as the sensing range set behind the host vehicle moves as much as the turning angle of the host vehicle, it may be impossible to accurately detect the other vehicle driving behind the host vehicle. As an example, as shown in FIG. 2A, when the host vehicle V1 is turning, the sensing range S is moved by the turning angle, thus the other vehicle V2 behind the host vehicle, which should be normally detected, may not be detected, then as a result, a warning signal may not be generated. In addition, as shown in FIG. 2B, when the host vehicle V1 is turning, as the sensing range S is moved by the turning angle, the other vehicle V2 located behind the host vehicle is sensed and a warning signal may be erroneously generated. More specifically, the other vehicle V2 behind is located in an adjacent driving lane, thus may have a risk of collision with the host vehicle V1 when the host vehicle V1 is changing lanes or turning. Meanwhile, the other vehicle V2 behind the host vehicle V1 thus may have no risk of collision when the host vehicle V1 is changing lanes or turning.

Accordingly, in the correcting at S30, driving path data of the vehicle and position data of the target may be corrected on the basis of the moving distance and the moving angle of the vehicle when the vehicle is turning. In other words, when the vehicle is turning, change in moving of the vehicle and change in moving of the target with respect to the vehicle may be derived on the basis of a moving distance and a moving angle of the vehicle, and a turning driving state is corrected just as it was a straight-line driving state.

Figure 3:
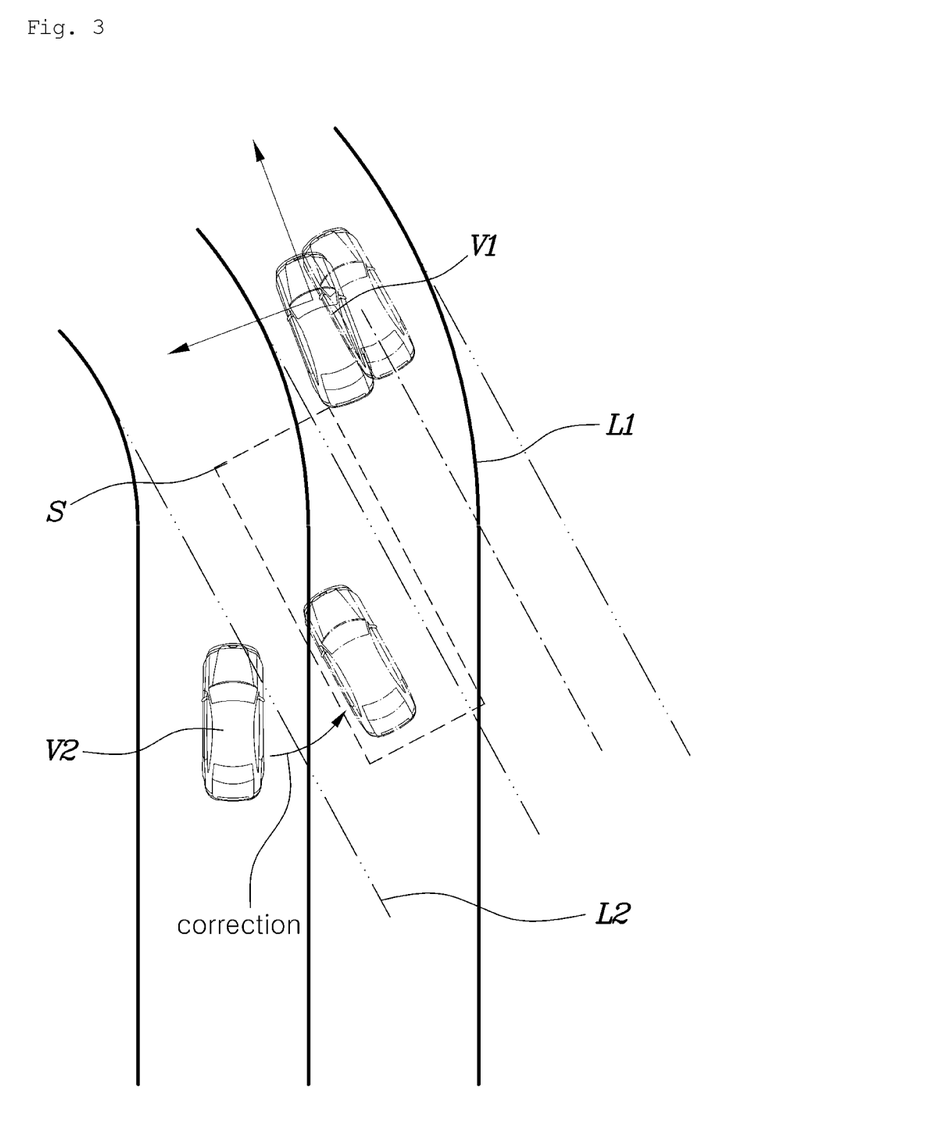

As shown in FIG. 3, when the vehicle is turning, the position of a sensing range becomes different, so that normal sensing of a following vehicle may not be performed. Therefore, when the vehicle is turning, on the basis of the moving distance and the moving angle of the vehicle, the driving path data of the vehicle which is actually turning and the position data of the target, shown as a solid line L1, may be corrected just as the vehicle was driving a straight-line, shown as a dotted line L2, so that the sensing range which is changed as the vehicle turns may detect a normal sensing range and may prevent a sensing error.

When the driving path data of the target and the position data of the target are corrected through the correcting at S30, a relative position of the target with respect to the vehicle may be identified through the identifying at S40. In other words, since the driving path data of the target and the position data of the target are corrected just as the vehicle was driving straight even when the vehicle is turning, a sensing error caused by the sensing range moving as the vehicle turns may be prevented. Furthermore, through the identifying the relative position of the target at S40, the sensing range may be adjusted by adjusting an angle of a sensor that detects the rear of the vehicle according to the relative position of the target with respect to the vehicle.

Hence, when the vehicle is turning, the driving path of the vehicle and the position of the target with respect to the following vehicle may be corrected on the basis of the driving state of the vehicle, so that, by accurately identifying the risk of collision between the host vehicle and the other vehicle behind, a warning signal according to the risk level of collision may be generated at the right timing.

In other words, as shown in FIG. 3, though the target may not be detected even when there is the target behind the host vehicle and the same is turning, by correcting the driving path of the vehicle and the position of the target with respect to the following vehicle on the basis of the driving state of the host vehicle, a warning signal according to the position of the target may be generated at the right timing, recognizing normally that the target is located within the sensing range.

According to the embodiment of the present invention in detail, in the collecting the driving path data at S10, when a vehicle is turning, past movement coordinates of the vehicle may be derived according to the moving distance and the moving angle on the basis of current reference coordinates of the vehicle. In this way, when the vehicle is turning, the past movement coordinates of the vehicle which are derived according to the moving distance and the moving angle of the vehicle may be used as a source for correcting the driving path data of the vehicle. In the collecting the driving path data at S10, the moving angle may be derived using a yaw rate and a steering wheel angle of the turning vehicle. Additionally, in the collecting the driving path data at S10, the moving angle may be derived with weight given according to a driving speed of the vehicle.

This may be derived through the following equation.

$$\Delta\Theta = \alpha * A + (1-\alpha) * B$$

Here, $\Delta\Theta$ is an angular change of the yaw axis, A is a yaw rate-based angular change, B is a steering wheel angular change, and a is the weight according to the angular change.

Additionally, A may be derived through the equation of Yawrate*dt, and B may be derived through the equation of Vs dt/Radius (radius of curvature). Here, Radius may be derived through wheelbase/sin (steering wheel angle/steering ratio), and a steering ratio is the ratio between a steering wheel and a vehicle wheel angle. Furthermore, Radius may be derived as follows as well.

$$\Delta\gamma \cdot \cos(\Delta\theta)\hat{a}_x + \Delta\gamma \cdot \sin(\Delta\theta)\hat{a}_y$$

In addition, the weight may be determined as follows.

$$0 \text{ when } 0 \le Vs < Vs1$$
$$Vs * \frac{1}{Vs2 - Vs1} - \frac{Vs1}{Vs2 - Vs1} \text{ when } Vs1 \le Vs < Vs2$$
$$1 \text{ when } Vs2 \le Vs$$

Figure 4:
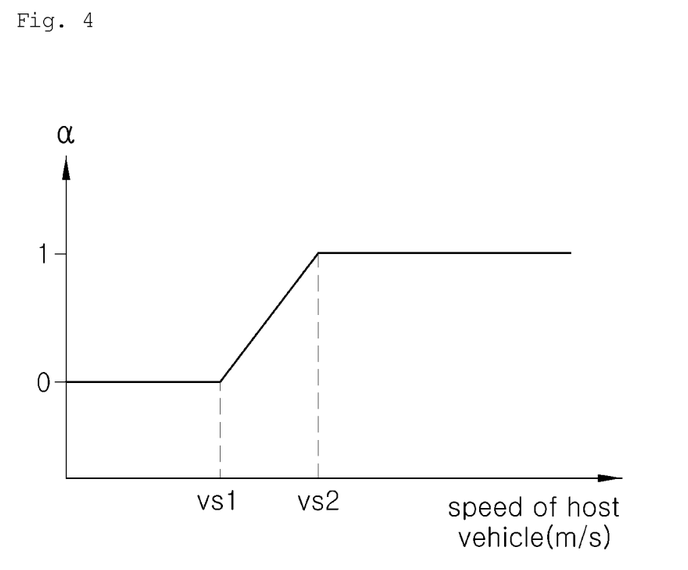

In other words, as shown in FIG. 4, the weight may be set according to a driving speed of the vehicle, and Vs1 and Vs2 may be preset according to a specification of the vehicle. Accordingly, when the driving speed of the vehicle is lower than Vs1, accuracy by the yaw rate sensor is lowered, thus the weight of the angular change of the steering wheel may be increased, and when the driving speed of the vehicle is higher than Vs2, the weight of yaw rate, which is directly related to posture of the vehicle, is suggested to be increased. In addition, when the driving speed of the vehicle is between Vs1 and Vs2, the weight may be derived by adding the weight of the steering wheel angle and the yaw rate.

In this way, the embodiment of the present invention derives past movement coordinates of the vehicle according to the moving distance and the moving angle on the basis of current reference coordinates of the vehicle, when the vehicle is turning. When the past movement coordinates of the vehicle is being derived, the position data of the target is also collected from the corresponding past movement coordinates so that moving information of the vehicle and the target may be stored.

As shown in FIG. 5, a target information correction according to the driving path of the vehicle may be performed as follows.

First, the moving information in the past k time may be updated and stored.

$\Delta x_k = -\Delta \gamma \cdot \cos(\Delta \theta_k)$ ($\hat{a}x$ direction)

$\Delta y_k = \Delta \gamma \cdot \sin(\Delta \theta_k)$ ($\hat{a}_y$ direction)

As shown in FIG. 5, the longitudinal direction, which is a driving direction, becomes the X axis, and the transverse direction becomes the Y axis, and r is the moving distance of the vehicle.

Thereafter, the driving path of the vehicle may be updated and stored.

$\Delta x_{k,i} = \Delta x_k$ $\Delta y_{k,i} = \Delta y_k$ $\Delta x_{k,i} = f(\Delta x_{k-1,i-1}, \Delta y_{k-1,i-1}, \Delta x_{k,i-1}, \Delta y_{k,i-1}, \Delta \theta_k)$ $\Delta y_{k,i} = g(\Delta x_{k-1,i-1}, \Delta y_{k-1,i-1}, \Delta x_{k,i-1}, \Delta y_{k,i-1}, \Delta \theta_k)$ This may be determined as follows.

Here, the position of i may be the closest point to the distance ($\sqrt{XPos^2 + YPos^2}$) of the target among the driving paths of the host vehicle when turning the same.

Hence, the target information according to the moving information of the host vehicle may be corrected as follows.

$XPos''' = h(XPos, YPos, \Delta x_{k,i-1}, \Delta y_{k,i-1}, \Delta x_{k,i-1}, \Delta y_{k,i-1}, \Delta \theta_{k-1})$ $YPos''' = i(XPos, YPos, \Delta x_{k,i-1}, \Delta y_{k,i-1}, \Delta x_{k,i-1}, \Delta y_{k,i-1}, \Delta \theta_{k-1})$ $XVel''' = j(XVel, YVel, \Delta x_{k,i-1}, \Delta y_{k,i-1}, \Delta x_{k,i-1}, \Delta y_{k,i-1}, \Delta \theta_{k-1})$ $YVel''' = k(XVel, YVel, \Delta x_{k,i-1}, \Delta y_{k,i-1}, \Delta x_{k,i-1}, \Delta y_{k,i-1}, \Delta \theta_{k-1})$ This may be determined as follows.

Through the above, the driving path data of the vehicle and the position data of the target may be corrected, and the relative position of the target with respect to the vehicle, on the basis of both the corrected driving path data of the vehicle and the position data of the target, may be identified. On the other hand, as the relative position of the target with respect to the vehicle may be identified through the identifying the relative position of the target at S40, a warning at S50 to determine whether or not a warning signal may be generated according to the position of the target may be further included. The warning signal through the warning at S50 may be a warning sound or a warning light, and whether or not the warning signal is generated may be determined per the risk level of collision according to the distance or relative speed between the vehicle and the target which is the other vehicle.

In detail, in the warning at S50, a warning signal may not be generated when the relative position of the target with respect to the vehicle is confirmed to be located on a straight line of the vehicle, as the target is detected when the vehicle is turning.

In other words, the relative position of the target with respect to the vehicle may be identified on the basis of both the corrected driving path data of the vehicle and position data of the target, which may be data in which the positions of the vehicle and the target are corrected as shown in FIG. 3.

As such, in the warning, a warning signal may not be generated when the relative position of the target with respect to the vehicle is confirmed to be located on a straight line of the vehicle, as the target is detected when the vehicle is turning. In other words, when the vehicle is turning, in the state in which the relative position of the target with respect to the vehicle is located on a straight line of the vehicle, even when the target is detected in a sensing range generated behind the vehicle, the actual target is located behind the vehicle, as shown in FIG. 6, thus a warning signal may not be generated.

Meanwhile, in the warning at S50, a warning signal may be generated when the relative position of the target with respect to the vehicle is located at a predetermined angle or more from the vehicle, as the target is not detected when the vehicle is turning. Here, the predetermined angle may be an adjacent driving lane behind the host vehicle or an arbitrary point depending on the risk level of collision with the other vehicle.

In other words, when the vehicle is turning, in the state in which the relative position of the target with respect to the vehicle is located at a predetermined angle or more from the vehicle, even when the target is not detected in a sensing range generated behind the vehicle, the actual target is located behind the vehicle thus there is a risk of collision, as shown in FIG. 3, so that a warning signal may be generated. Hence, when the vehicle is turning, the driving path of the host vehicle and the position of the other vehicle behind the host vehicle are corrected on the basis of the driving state of the host vehicle, so that, by accurately identifying the risk of collision between the host vehicle and the other vehicle behind, a warning signal according to the risk level of collision may be generated at the right timing.

On the other hand, the system for target detection of a vehicle, as shown in FIG. 7, includes: a distance calculator 10 configured to determine a moving distance of the vehicle; an angle calculator 20 configured to determine a moving angle of the vehicle; a target sensor 30 configured to detect a position of a target; and a controller 40 configured to collect driving path data of the vehicle, detect position data of the target, and correct past driving path data of the vehicle and position data of the target on the basis of the moving distance and the moving angle of the vehicle when the vehicle is turning, and to identify a relative position of the target with respect to the vehicle on the basis of the corrected driving path data of the vehicle and the position data of the target.

The distance calculator 10 includes a GPS, a speed sensor, and a wheel sensor, and may collect information of a moving distance of a vehicle.

The angle calculator 20 includes a steering wheel sensor and a yaw rate sensor, and may collect information of a moving angle of a vehicle.

The target sensor 30 includes a radar sensor, a camera sensor, and a laser sensor, and may collect information of the other vehicle driving behind the host vehicle.

A warning signal in line with the risk level of collision may be generated at the right timing as the controller 40 corrects the driving path of the host vehicle and the position of the following vehicle on the basis of a driving state of the host vehicle when the same is turning.

The controller 40 may derive a plurality of past movement coordinates on the basis of the driving path data, may derive position coordinates of the target from each past movement coordinate which are detected by the target sensor, and may correct the past movement coordinates and the position coordinates to be arranged in one direction. Through accurate position determination according to the driving path of the vehicle and the driving path of the target when the vehicle is turning, the risk level of collision between the vehicle and the target may be accurately identified.

Meanwhile, the system further includes a warning generator 50 to generate a warning signal according to a risk level of collision between the vehicle and the target. The warning generator 50 may generate a warning signal by flickering a warning light through a side mirror, a cluster, or the like, or generating a warning sound inside the vehicle.

The controller 40 may determine whether or not a warning signal to be generated through the warning generator 50 according to the position of the target, as the relative position of the target with respect to the vehicle is identified.

In more detail, the controller 40 may prevent the warning signal from being generated through the warning generator 50 as it is confirmed that the relative position of the target with respect to the vehicle is located on a straight line of the vehicle as the target is detected when the vehicle is turning.

Additionally, the controller 40 may generate the warning signal through the warning generator 50 as the relative position of the target with respect to the vehicle is located at a predetermined angle or more from the vehicle when the target is not detected when the vehicle is turning.

The controller 40 may include a processor or a microprocessor. The controller 40 may also include a computer readable recording medium storing computer readable code, algorithm, or software. The processors/microprocessor may perform functions, operations, steps, etc., described with reference to the controller 40, when executing the computer readable code, algorithm, or software stored on the computer readable recording medium.

According to the embodiment of the present invention, a warning signal in line with the risk level of collision may be generated at the right timing as the collision risk between the host vehicle and the following vehicle is accurately identified by correcting the driving path of the host vehicle and the position of the following vehicle on the basis of a driving state of the host vehicle when the same is turning.

Although the preferred embodiments of the present invention have been disclosed for illustrative purposes, those skilled in the art will appreciate that various modifications, additions and substitutions are possible, without departing from the spirit and scope of the present invention.

What is claimed is:

1. A method for target detection of a host vehicle, comprising:
   collecting, by a first sensor, driving path data of the host vehicle; detecting, by a second sensor, position data of a target; correcting, by a processor, the driving path data of the host vehicle and the position data of the target as though the host vehicle is in a straight-line driving state on the basis of a moving distance and a moving angle of the host vehicle when the host vehicle is turning; identifying, by the processor, a relative position of the target with respect to the host vehicle on the basis of both the corrected driving path data of the host vehicle and the position data of the target to determine whether the target is in a blind spot of the host vehicle; and
   determining, according to the position of the target, whether or not to generate a warning signal, as the relative position of the target with respect to the host vehicle is identified through the identifying the relative position of the target, wherein the determining comprises: determining to generate the warning signal when the relative position of the target with respect to the host vehicle is located at a predetermined angle or more from the host vehicle, as the target is not detected when the host vehicle is turning, and the method further comprises outputting the warning signal.

2. The method of claim 1, wherein the collecting the driving path data comprises, when the host vehicle is turning, deriving past movement coordinates of the host vehicle according to the moving distance and the moving angle on the basis of current reference coordinates of the host vehicle.

3. The method of claim 2, wherein the collecting the driving path data further comprises deriving the moving angle based on a yaw rate and a steering wheel angle of the host vehicle.

4. The method of claim 3, wherein the collecting the driving path data further comprises deriving the moving angle with a weight given according to a driving speed of the host vehicle.

5. The method of claim 2, wherein the correcting the driving path data and the position data comprises deriving a plurality of past movement coordinates and position coordinates of the target detected from each past movement coordinate, and correcting the past movement coordinates and the position coordinates so that the past movement coordinates and the position coordinates are arranged in one direction.

6. A system for target detection of a host vehicle, the system comprising: a distance calculator configured to determine a moving distance of the host vehicle;
   an angle calculator configured to determine a moving angle of the host vehicle; a first sensor configured to collect driving path data of the host vehicle; a second sensor configured to detect position data of a target; a controller configured to correct past driving path data of the host vehicle and position data of the target as though the host vehicle is in a straight-line driving state on the basis of the moving distance and the moving angle of the host vehicle when the host vehicle is turning, and to identify a relative position of the target with respect to the host vehicle on the basis of the corrected driving path data of the host vehicle and the position data of the target to determine whether the target is in a blind spot of the host vehicle; and a warning generator configured to generate a warning signal according to a risk level of collision between the host vehicle and the target, wherein the controller determines according to the position of the target whether or not the warning signal to be generated through the warning generator, as the relative position of the target with respect to the host vehicle is identified, and the controller generates the warning signal through the warning generator as the relative position of the target with respect to the host vehicle is located at a predetermined angle or more from the host vehicle when the target is not detected when the host vehicle is turning.

7. The system of claim 6, wherein the controller derives a plurality of past movement coordinates on the basis of the driving path data, derives position coordinates of the target from each past movement coordinate which are detected by the second sensor, and corrects the past movement coordinates and the position coordinates to be arranged in one direction.

\* \* \* \* \*